(12) United States Patent
Hannel et al.

(10) Patent No.: US 8,914,432 B2
(45) Date of Patent: Dec. 16, 2014

(54) REAL WORLD TRAFFIC

(75) Inventors: Clifford Hannel, Thousand Oaks, CA (US); David Anderson, Gross Pointe Park, MI (US)

(73) Assignee: Ixia, Calabasas, CA (US)

( * ) Notice: Subject to any disclaimer, the term of this patent is extended or adjusted under 35 U.S.C. 154(b) by 3000 days.

(21) Appl. No.: 10/646,983

(22) Filed: Aug. 21, 2003

(65) Prior Publication Data

US 2005/0041592 A1  Feb. 24, 2005

Related U.S. Application Data

(63) Continuation-in-part of application No. 09/968,432, filed on Oct. 1, 2001, now Pat. No. 7,194,535.

(51) Int. Cl.
| | |
|---|---|
| G06F 15/16 | (2006.01) |
| H04L 12/26 | (2006.01) |
| H04L 12/24 | (2006.01) |

(52) U.S. Cl.
CPC ............ *H04L 43/50* (2013.01); *H04L 12/2697* (2013.01); *H04L 41/145* (2013.01)
USPC ........................................................ 709/200

(58) Field of Classification Search
USPC .......................................... 709/200; 370/241
See application file for complete search history.

(56) References Cited

U.S. PATENT DOCUMENTS

| | | |
|---|---|---|
| 5,247,517 A | 9/1993 | Ross et al. |
| 5,343,463 A | 8/1994 | van Tetering et al. |
| 5,477,531 A | 12/1995 | McKee |
| 5,535,338 A | 7/1996 | Krause et al. |
| 5,568,471 A | 10/1996 | Hershey et al. |
| 5,590,285 A | 12/1996 | Krause et al. |
| 5,600,632 A | 2/1997 | Schulman |
| 5,657,438 A | 8/1997 | Wygodny |
| 5,671,351 A | 9/1997 | Wild |
| 5,761,486 A | 6/1998 | Watanabe |
| 5,787,253 A | 7/1998 | McCreery et al. |
| 5,822,520 A | 10/1998 | Parker |
| 5,878,032 A | 3/1999 | Mirek et al. |
| 5,905,713 A | 5/1999 | Anderson et al. |
| 5,974,237 A | 10/1999 | Shurmer et al. |
| 6,028,847 A | 2/2000 | Beanland |
| 6,044,091 A | 3/2000 | Kim |

(Continued)

FOREIGN PATENT DOCUMENTS

EP        0895375        2/1999

OTHER PUBLICATIONS

Cooper, Session traces: an enhancement to network simulator, Performance, computing and Communications Conference, Scottsdale, AZ, Feb. 10, 1999.

(Continued)

*Primary Examiner* — Esther Benoit
(74) *Attorney, Agent, or Firm* — SoCal IP Law Group LLP; John E. Gunther; Steven C. Sereboff

(57) ABSTRACT

Methods and apparatus for testing real-world performance of an system under test are disclosed. The system under test is loaded with interactive transactions. A realistic mix of network traffic is simulated on the communications network. The performance of the system under test under load is tested. Accordingly, a real-world test of the system under test is provided.

41 Claims, 5 Drawing Sheets

(56) References Cited

U.S. PATENT DOCUMENTS

| | | | |
|---|---|---|---|
| 6,108,800 A | 8/2000 | Asawa | |
| 6,122,670 A | 9/2000 | Bennett et al. | |
| 6,148,277 A | 11/2000 | Asava | |
| 6,157,955 A | 12/2000 | Narad et al. | |
| 6,172,989 B1 | 1/2001 | Yanagihara et al. | |
| 6,173,333 B1 | 1/2001 | Jolitz et al. | |
| 6,189,031 B1 | 2/2001 | Badger | |
| 6,233,256 B1 | 5/2001 | Dieterich et al. | |
| 6,272,450 B1 * | 8/2001 | Hill et al. | 703/13 |
| 6,279,124 B1 | 8/2001 | Brouwer et al. | |
| 6,295,557 B1 * | 9/2001 | Foss et al. | 709/224 |
| 6,321,264 B1 | 11/2001 | Fletcher et al. | |
| 6,345,302 B1 | 2/2002 | Bennett et al. | |
| 6,363,056 B1 | 3/2002 | Beigi et al. | |
| 6,446,121 B1 | 9/2002 | Shah | |
| 6,507,923 B1 | 1/2003 | Wall et al. | |
| 6,545,979 B1 | 4/2003 | Poulin | |
| 6,621,805 B1 | 9/2003 | Kondylis et al. | |
| 6,724,730 B1 * | 4/2004 | Mlinarsky et al. | 370/241 |
| 6,789,100 B2 | 9/2004 | Nemirovsky | |
| 6,832,184 B1 * | 12/2004 | Bleier et al. | 703/23 |
| 6,845,352 B1 | 1/2005 | Wang | |
| 6,950,405 B2 | 9/2005 | Van Gerrevink | |
| 6,961,313 B1 * | 11/2005 | Gaspar | 370/242 |
| 7,075,893 B1 * | 7/2006 | Mlinarsky et al. | 370/241 |
| 7,342,897 B1 * | 3/2008 | Nader et al. | 370/255 |
| 2002/0080781 A1 | 6/2002 | Gustavsson | |
| 2003/0009544 A1 | 1/2003 | Wach | |
| 2003/0012141 A1 * | 1/2003 | Gerrevink | 370/250 |
| 2003/0043434 A1 | 3/2003 | Brachmann et al. | |
| 2003/0139919 A1 | 7/2003 | Sher | |
| 2003/0231741 A1 | 12/2003 | Rancu et al. | |
| 2004/0117474 A1 | 6/2004 | Ginkel | |

OTHER PUBLICATIONS

Ye, Tao, Network Management and Control Using collaborative On-Line Simulation, Rensselaer Polytechnic Institute, 2003.

Ye, Tao, Large-Scale Network Parameter Configuration Using an On-line Simulation Framework, Technical report, ECSE Department, Rensselear Polytechnic Institute, 2002.

San-Qi Li, et al., SMAQ: A Measurement-Based Tool for Traffic Modeling and Queuing Analysis Part I, IEEE Communications Magazine, Aug. 1, 1998.

San-Qi Li, et al., SMAQ: A Measurmont-Based Tool for Traffic Modeling and Queuing Analysis Part II, IEEE Communications Magazine, Aug. 1, 1998.

Marchette, A Statistical Method for Profiling Network Traffic, USENIX, Ap. 1999.

* cited by examiner

REAL WORLD TRAFFIC

RELATED APPLICATION INFORMATION

This application is a continuation-in-part of application Ser. No. 09/968,432 filed Oct. 1, 2001 and entitled "Methods and Systems for Testing Stateful Network Communications Devices," which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to methods and systems for testing network communications devices, systems and applications.

2. Description of Related Art

Testing high capacity, IP-based intelligent networks requires the origination of Internet-scale volumes of simulated user traffic in laboratory environments. The current generation of high-speed network performance testing equipment is generally based on either:

- Proprietary hardware-based "packet blasters" that use pre-configuring quasi-static packets at or near "wirespeed;" or
- TCP socket-based software that runs on large numbers of general purpose (or slightly modified) computing platforms.

As the density, speed and intelligent traffic management capabilities of network devices increase, traditional high-volume traffic generation solutions are less able to simulate real-world scenarios.

Traditional network routing and switching devices are stateless in that these devices make decisions based on information that is contained within these headers without maintaining any information about previous packets. They do not maintain any type of connection to the client or server at either end of the TCP transaction.

In order to test a stateless device, simulated traffic only needs to look like "real" traffic on a packet-by-packet basis. There does not need to be a complex relationship between the packets, so the transmitting device does not need to maintain any state or have any dynamic behaviors. For this reason, the current generation of high performance traffic generators do not require a full TCP/IP stack for performance testing. Specialized hardware is used to generate wirespeed packets that are varied algorithmically by overlaying variable length incrementing or random patterns over a "base packet" without any consideration of received packets. These conventional stateless test devices are commonly referred to as packet blasters.

True TCP sessions contain a feedback mechanism. For example, a TCP receiver sends acknowledgement packets to a TCP sender that advertise a window size to the TCP sender that inform the TCP sender the size of the receiver's receive buffer. The sender uses the advertised window size to control the flow of packets sent to the receiver. This mechanism causes the flow of incoming traffic to vary as a function of receiver performance. For instance, as a TCP receiver becomes overloaded, the rate of removing and processing packets from its TCP receive buffer decreases. As a result, the window size advertised to the sender decreases, and the TCP sender slows the flow of packets sent to the receiver. In addition, the mechanism can generate redundant data. For example, if a TCP receiver receives an out-of-sequence packet, the receiver will send a duplicate acknowledgement to the sender indicating that an out of sequence packet was received. Because this feedback mechanism exists on every TCP connection, overall TCP session throughput becomes the dominant performance metric.

Unlike traditional switches and routers, server load-balancing (SLB) devices may maintain state. Server load-balancing devices are also referred to as content switches. In the most basic implementations, this takes the form of "persistent sessions" where all packets from a specific user (source IP address) are routed to the same server (destination IP address). In order to accomplish this, the SLB may maintain a table of established client/server connections and look up the server to which a packet should be routed based on the client address. Other examples of stateful network devices include firewalls, VPN gateways, traffic shapers, spam filters and virus-scanning gateways.

The next generation of SLB devices is much more sophisticated. They may make routing decisions based on a combination of data from the IP, TCP and HTTP header (URL, Cookie) and may even actively participate in a client/server session by proxying and aggregating multiple client connections into a pool of pre-existing server connections. Since the SLB may have a full TCP/IP stack, it becomes much more difficult to test the device with stateless, algorithmically generated traffic. The performance of the SLB is sensitive to many more characteristics of the TCP session.

Typical switches and routers only process Ethernet and IP headers, respectively. Traditional server load balancers process the IP source and destination address fields and TCP source and destination port fields. Next generation server load balancers process every header from the Ethernet header through application-level headers. Furthermore, some switches and routers also do "deep packet inspection," looking past even the application-level headers. As a result, these next generation devices cannot be tested using traditional stateless packet blasters.

Today's load balancing switches generally handle tens of thousands of session establishments per second with fewer than 100,000 concurrent sessions established. Moore's Law is adhered to not only in general purpose computing platforms but in network devices as well: the new generation of load balancers will handle hundreds of thousands of sessions per second with 1,000,000 or more concurrent sessions established.

While stateless hardware-based solutions cost a fraction as much as fully stateful software-based solutions for high packet rates, stateless solutions do not provide realistic enough traffic to accurately measure the performance of stateful network communications devices, such as new generation SLBs. In fact, SLB devices that proxy connections with nearly a full TCP stack will drop simulated connections attempted by such a device. At the other extreme, software-based full stack implementations are prohibitively expensive to acquire and difficult to maintain and operate for high rates and/or volumes of connections. For example, software-based full TCP stack implementations may require multiple machines with multiple processors and network interfaces to achieve the number of TCP sessions required to test a stateful network communications device, such as a server load balancer. Similarly, TCP-based application performance cannot be determined/inferred by generating stateless traffic and measuring network layer performance metrics.

DETAILED DESCRIPTION OF THE INVENTION

Figure 1:
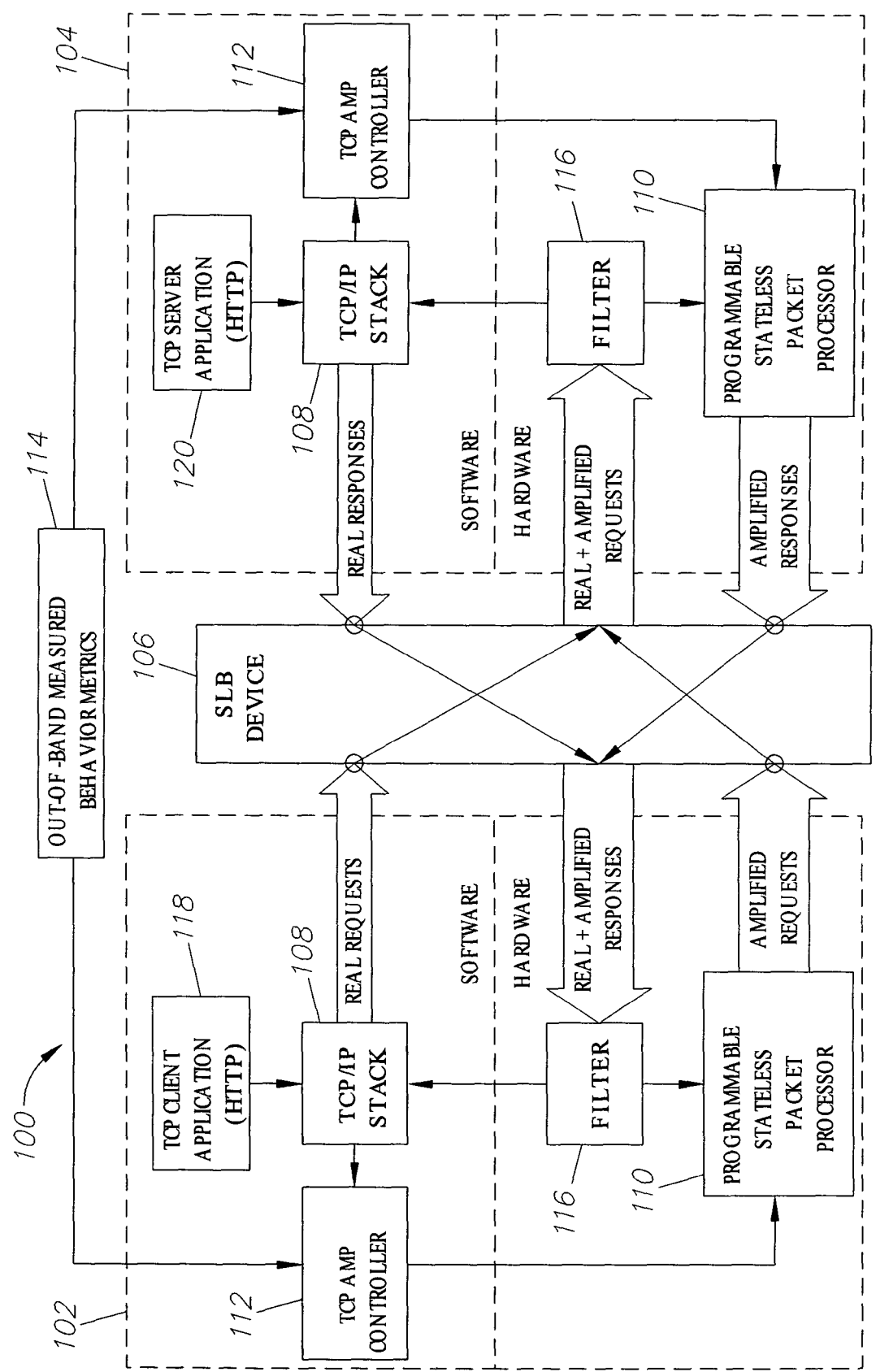
FIG. 1 is a block diagram of a system for testing a stateful network communications device according to an embodiment of the present invention.

Throughout this description, the embodiments and examples shown should be considered as exemplars, rather than limitations on the apparatus and methods of the present invention.
Description of the System Referring now to FIG. 1, there is shown a functional block diagram illustrating exemplary components of a system for testing a stateful network communications device according to an embodiment of the present invention. In FIG. 1, a test system 100 includes a first test device 102 and a second test device 104 for testing a device under test (DUT) 106. In the illustrated example, the device under test 106 is a server load balancer.

Although the example illustrated in FIG. 1 includes two test devices, the present invention is not limited to using two test devices to test a server load balancer. For example, in an alternative test scenario, a single test device could be used to test a server load balancer or other device. If two test devices are used to test a server load balancer, one test device can function as a client and the other test device can function as multiple servers. In yet another alternative test scenario, one or more test devices 102 may be configured as clients and used to test the TCP functionality of a server, such as a web server.

In FIG. 1, the test devices 102, 104 each include TCP/IP stacks 108 for implementing full TCP/IP communications capabilities. By "full TCP/IP communications capabilities," it is meant that the TCP/IP stacks 108 implement the full TCP protocol, including timeouts, retransmissions, flow control, etc. The TCP protocol that may be implemented by the TCP/IP stacks 108 is described in IETF RFCs 675, 761, and 793. The IP protocol that may be implemented by the TCP/IP stacks 108 is described in IETF RFCs 760 and 791. According to the present invention, data collected on full TCP/IP sessions established by the TCP/IP stacks 108 will be used to modify test behavior on the simulated stateless TCP/IP connections, as will be discussed in more detail below.

The operation of the TCP/IP stacks 108 can be contrasted with that of programmable stateless packet processors 110. The programmable stateless packet processors 110 simulate TCP/IP communications in a stateless manner. By "stateless," it is meant that the programmable stateless packet processors 110 make response decisions based only on information contained in an inbound packet.

The programmable stateless packet processors 110 may maintain no state about a connection from one packet to the next. For example, when the programmable stateless processors 110 receive a SYN packet, the processors 110 formulate and send a SYN plus ACK. The programmable stateless packet processors 110 may not implement any of the stateful procedures implemented by the TCP/IP stacks 108. For example, the programmable stateless packet processors 110 may not implement flow control or retransmissions, both of which require complex code and processing resources.

Because the programmable stateless packet processors 110 make decisions based on information in inbound packets, the programmable stateless packet processors 110 are not required to maintain connection tables of open TCP sessions. The lack of connection tables greatly reduces the processing and memory required for each simulated connection over that of a full TCP/IP session or connection. As a result, the TCP/IP test devices 102, 104 can simulate more TCP/IP sessions with a reduced amount of hardware over conventional full-stack test devices while still causing the DUT to add or reference information in its own state table.

The behavior of the programmable stateless packet processors 110 may be programmable or controllable by TCP amplification (AMP) controllers 112. The TCP AMP controllers 112 receive performance metrics regarding stateful TCP connections maintained by the TCP/IP stacks 108 and use this information to modify the behavior of the simulated stateless TCP connections. Performance metrics may be obtained directly from the TCP/IP stacks 108 or from an external measurement device 114, such as a packet sniffer. Exemplary performance measurements that may be used include retransmission rate, fragmentation, packet sizes, drop/reset rates, and other information that requires stateful TCP session handling. These metrics can be used to change the corresponding behavior of the stateless TCP connections implemented by the programmable stateless packet processors 110 to more closely simulate a realistic mix of traffic. For instance, if the measurement device 114 detects that a certain percentage of TCP/IP segments are being retransmitted, the TCP AMP controller 112 on the test device 102 may instruct the programmable stateless packet processor 110 to retransmit the same percentage of TCP segments on the stateless connections. Thus, by using data collected on the stateful connections to modify test conditions on the stateless connections, the test devices 102, 104 closely simulate live network connections.

The test devices 102, 104 may also include filters 116 for filtering data received on stateless and stateful TCP connections. For example, the filters 116 may contain tables that associate IP addresses with stateless and stateful connections. When a packet is received over one of the connections, the filters 116 determine whether to send the packets to the TCP/IP stack 108 or the programmable stateless packet processor 110 based on the connection tables.

The test devices 102, 104 may also include TCP applications 118 and 120. In the illustrated example, the TCP application 118 may be a client application, such as an HTTP client application. The TCP application 120 may be a TCP server, such as an HTTP server. The present invention is not limited to using HTTP to test a device under test. Any application capable of using the underlying services of TCP to send or receive data is within the scope of the invention. For example, other applications that may be used include FTP, telnet, or other stateful applications.

In the example illustrated in FIG. 1, the components 108, 112, 118 are illustrated as being implemented in software, while the components 110, 116 are illustrated as being implemented in hardware. However, the present invention is not limited to such an implementation. Any of the components illustrated in FIG. 1 may be implemented in hardware, software, or a combination of hardware and software.

Figure 2:
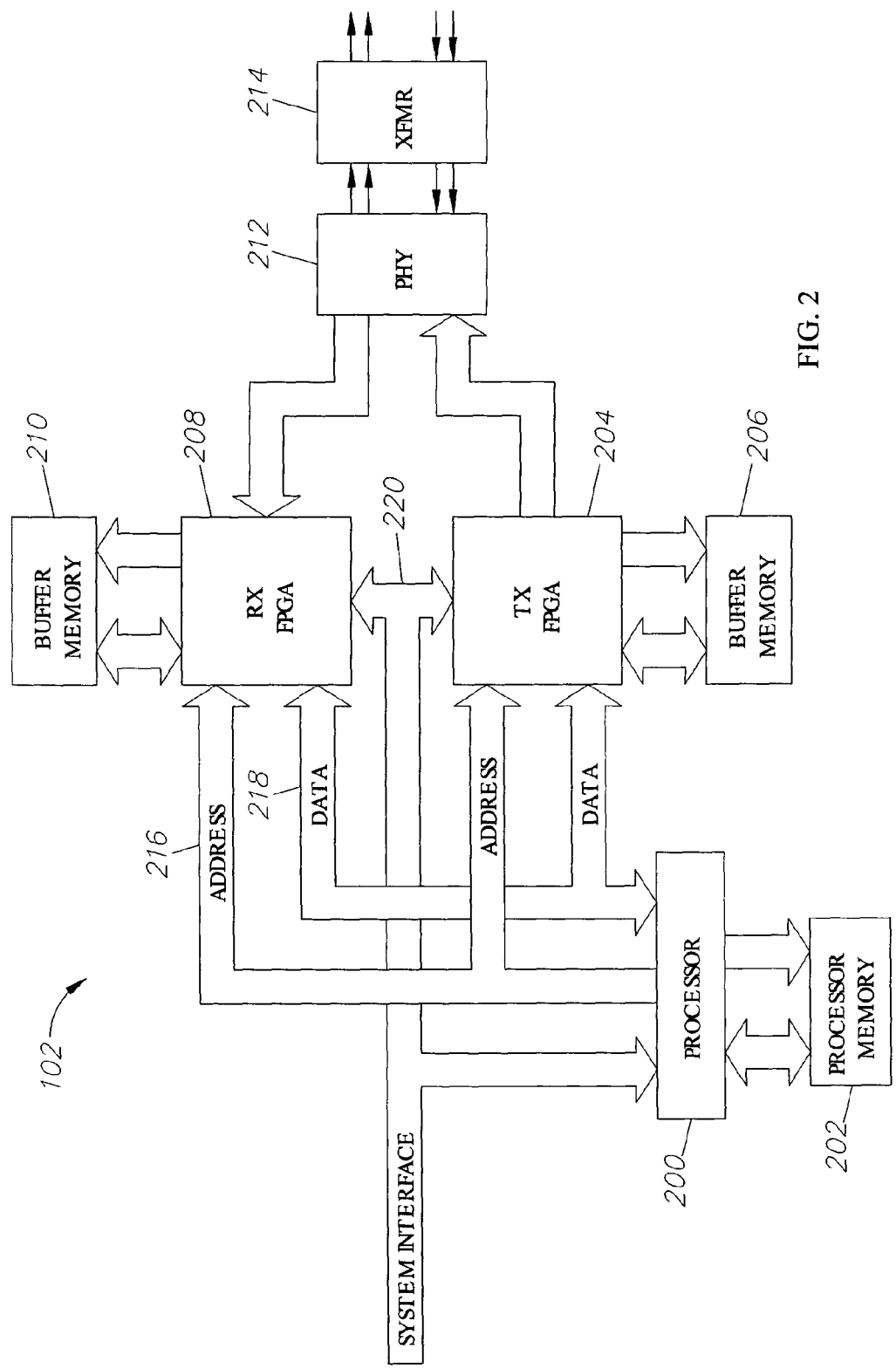
FIG. 2 is a block diagram of exemplary hardware that may be associated with a system for testing a stateful network communications device according to an embodiment of the present invention.

Referring now to FIG. 2, there is shown a block diagram of exemplary hardware for system for testing a stateful network communications device according to an embodiment of the present invention. In FIG. 2, the test device 102 includes a processor 200 and a processor memory 202. Components 200 and 202 may be used to run the TCP/IP stacks 108 and the TCP AMP controllers 112.

A transmit field programmable gate array (TX FPGA) 204 and a buffer memory 206 may implement the programmable stateless packet processors 110 illustrated in FIG. 1. Using an FPGA to implement programmable stateless packet processors 110 is beneficial because an FPGA is capable of performing limited processing on data at much higher rates than a general-purpose processor. In addition, the behavior of an FPGA can be modified at runtime without flow interruption by an application running on a local processor or an application running on another processor via the system interface. For example, if the TX FPGA 204 implements the programmable stateless packet processor 110, and the TCP AMP controller 112 is implemented in the processor 200, output from the TCP AMP controller 112 executing on the processor 200 may be used to alter the behavior of the programmable stateless packet processor 110 executing on the TX FPGA 204.

In the illustrated embodiment, the test device 102 includes an RX FPGA 208 and a buffer memory 210. The components 208 and 210 may implement the packet filters 116 illustrated in FIG. 1. In particular, the RX FPGA 208 receives packets from the physical network interface and forwarding the packets to either the programmable stateless packet processor 110 or the TCP/IP stack 108. Like the TX FPGA 204, an RX FPGA 208 is capable of performing limited processing on data at much higher rates than a general-purpose processor. In addition, the behavior of the RX FPGA 208 can be modified on the fly by an application running on a local processor or an application running on another computer via the system interface.

A physical layer chip 212 provides a physical interface for transmitting and receiving packets. The type of interface implemented by the physical layer chip 212 may be an electrical interface or an optical interface. For example, the physical layer chip 212 may implement Ethernet over 100 Base T copper media or IP using Packet Over SONET over optical media. In the illustrated example, the processor 200, the TX FPGA 204, and the RX FPGA 208 are connected via address lines 216, data lines 218, and a system bus 220.

The system bus 220 allows a host controller or client application to manage multiple ports in a coordinated fashion. For example, in an actual implementation, multiple adapter cards, each containing the multiple sets of the components in FIG. 2, may be used where each adapter has one or more physical network interfaces. The adapter cards may be plugged into a host system (chassis), which may include a general-purpose computer.

The TCP application 118 or 120 may execute on the embedded processor 200 or on the host system processor. Because each test device is capable of simulating real TCP connections without maintaining state, the amount of TCP connections per network interface is increased over conventional test systems. As a result, TCP/IP communications devices, such as servers and server load balancers can be tested with a reduced amount of hardware.

Description of the Methods

Figure 3:
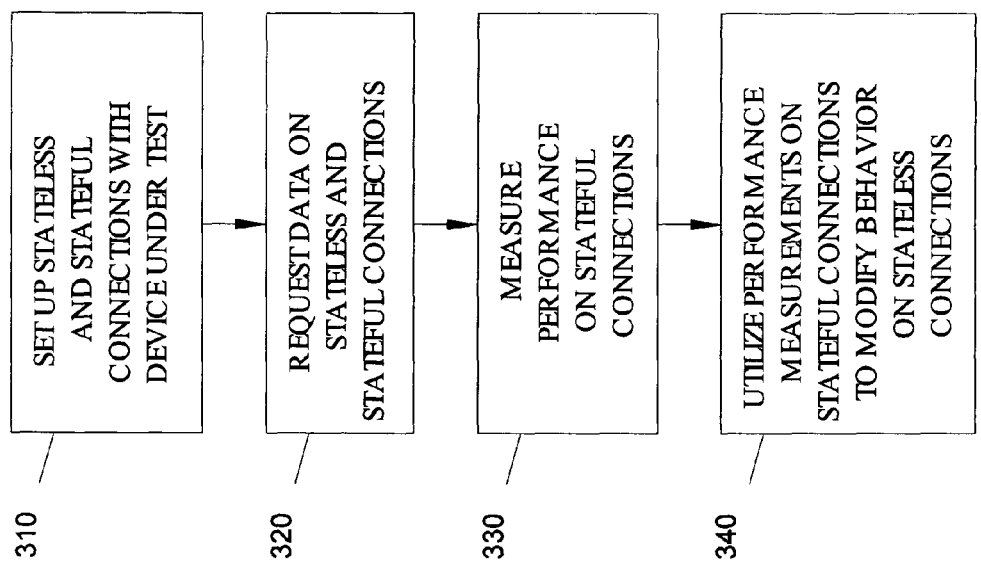
FIG. 3 is a flow chart illustrating exemplary steps for testing a stateful network communications device according to an embodiment of the present invention.

Referring now to FIG. 3, there is shown a flow chart illustrating an exemplary process for testing a stateful communications device according to an embodiment of the present invention. In step 310, stateless and simulated stateful connections are established with a device under test. The device under test may be any type of stateful network communications device, such as an application server or a server load balancer. If the device under test is an application server, a single test system, such as the test device 102 illustrated in FIG. 1 may be configured as a client and used to establish connections with the application server. If the device under test is a server load balancer, one test device 102 may be configured as a client to establish connections with the server load balancer and another test device 104 may be configured as a server farm to receive connection requests from the server load balancer. In yet another alternative implementation, multiple test devices 102 may be used to test multiple devices under test, such as a server farm.

Stateful connections with the device under test may be established using stateful TCP connection establishment procedures as described in the above-referenced TCP/IP protocol standards documents. An exemplary procedure for establishing simulated stateless TCP/IP connections with a device under test will be described in detail below with regard to FIG. 4.

In step 320, the test device 102 requests data on the stateless and stateful connections. If the device under test is a web server, requesting data may include requesting data using the HTTP protocol. If the device under test is a server load balancer, requesting data may include requesting data from any type of application server that may be proxied by a server load balancer. In step 330, performance and/or behavior measurements are gathered on the stateful TCP connections. As stated above, examples of such metrics include the rate of connections being dropped, the rate of retransmissions, the rate of packets being dropped, etc.

In step 340, these measurements are used to modify the behavior of the simulated stateless connections to more closely simulate live network conditions. For example, if it is determined that packets are being retransmitted a certain rate on the stateful connections, the test device 102 may be configured to retransmit packets at the same rate. If the device under test is a server load balancer and the device on the other side of the server load balancer is test device 104, programmable stateless packet processor 110 of test device 104 may be configured to retransmit data packets to test device 102. Test device 102 may be configured by its local TCP AMP controller 112 to disregard retransmitted packets.

Since the programmable stateless packet processor 110 only reacts to inbound packets, some independent mechanism must be used to initiate a sequence of response packets. One method for initiating a response is by generating a "synchronous stream" of SYN packets using traditional packet-blaster capability that may be available in the TX FPGA 204. This sync stream can generate packets at up to wire speed with extremely precise timing of gaps between packets (fractions of a microsecond precision). In a typical test, a sync stream will be configured to kick off the pseudo-sessions. The rate will be programmed according to the test that a user wants to perform.

One exemplary measurement that a user may want to determine in testing a device or a network is the number of sessions of a given type that can be handled at a given tolerable drop rate. For example, an SLB manufacturer might want to know how many HTTP GETs of a particular average size (or mix) can be done per second before their device starts dropping packets (due to buffers filling, for example).

The measured retransmit rate from the full stack in software can be used to change the rate of the sync stream on the stateless connections (continuously without stopping/restarting the test) until the desired drop rate is achieved (in this case, zero—but in practicality it will be some small percentage). This is much more efficient than other methods which require a linear or binary search to "home in" on the maximum rate achievable at some drop rate. A search algorithm like this would require running large numbers of tests in succession at different initial rates. The present invention thus avoids these difficulties associated with conventional test methods.

Although in the example illustrated in FIG. 3, the present invention uses measurements taken on stateful connections to modify the behavior of tests executing on stateless connections, the present invention is not limited to such an embodiment. For example, in an alternate embodiment, the present invention may include utilizing measurements taken on the stateless connections to modify the behavior of the stateless connections. In yet another alternative embodiment, the present invention may include using measurements taken on both the stateless and stateful connections to modify the behavior of the stateless connections. The behavior of the stateful connections may also be modified. Any combination of using feedback on the stateless and stateful connections to modify the behavior of the stateless and/or the stateful connections is intended to be within the scope of the invention.

Figure 4:
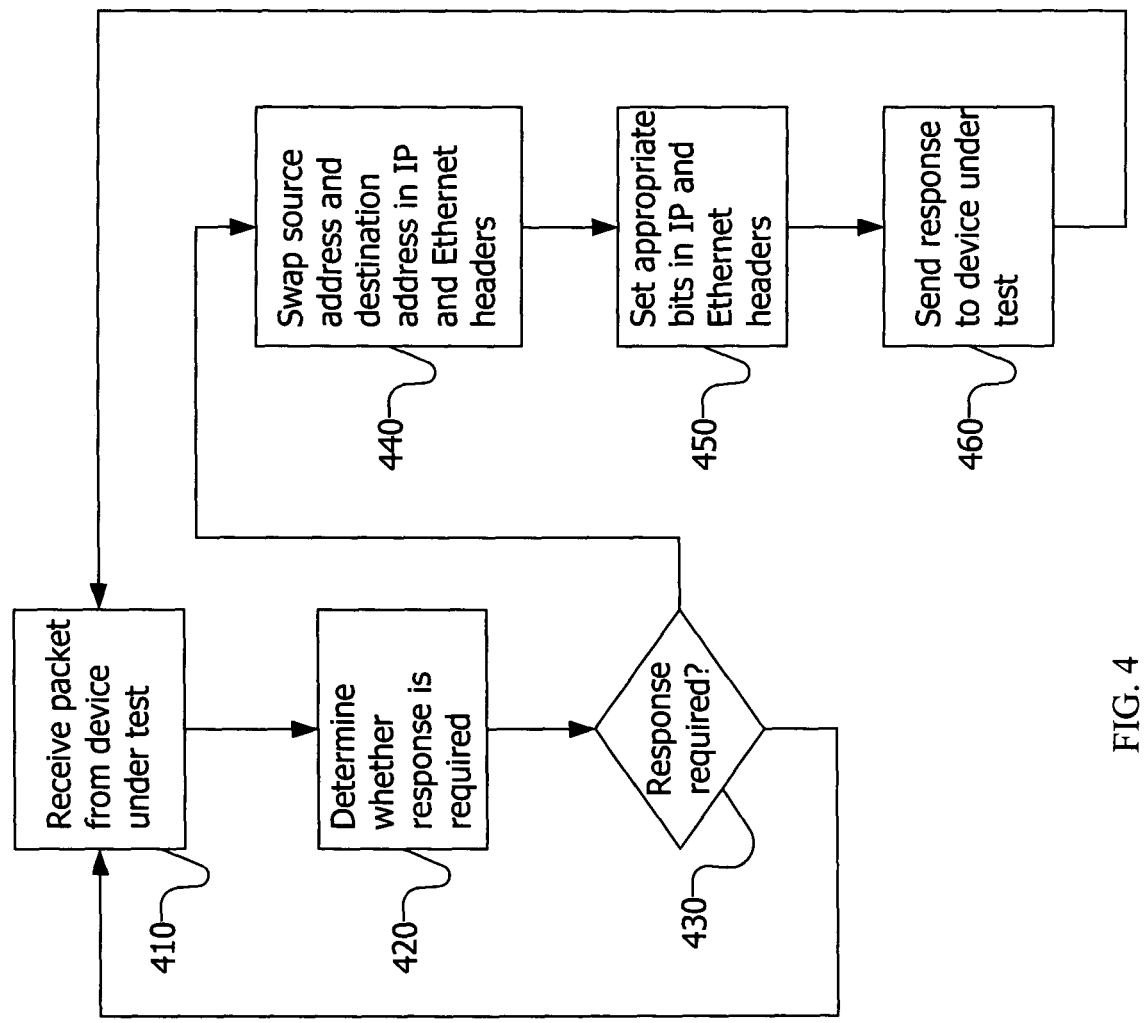
FIG. 4 is a flow chart illustrating exemplary operations performed by a programmable stateless packet processor according to an embodiment of the present invention.

In yet another alternative embodiment, the present invention may include a method and a system for testing a device under test using the programmable stateless TCP processor 110 without using feedback. Referring now to FIG. 4, there is shown a flow chart illustrating exemplary operations performed by a programmable stateless packet processor according to an embodiment of the present invention. In step 410, the programmable stateless packet processor 110 receives a packet from a device under test. In steps 420 and 430, the programmable stateless packet processor 110 determines whether a response is required for the packet. For example, if the packet is a SYN packet, programmable stateless packet processor may determine that a SYN plus ACK is required in order to establish a simulated TCP connection with the device under test. If a response is not required for a received packet, control returns to step 410 where programmable stateless packet processor 110 waits for the next packet.

If the programmable stateless packet processor 110 determines that a response is required for the received packet, programmable stateless packet processor 110 prepares a response packet based on the information in the received packet. For example, in step 440, programmable stateless packet processor 110 swaps the source and destination addresses in the IP and Ethernet headers of the received packet, assuming Ethernet is the underlying communication medium.

In step 450, the programmable stateless packet processor 110 sets the appropriate bits in the TCP and network headers. This step may include computing header checksums, inserting the correct sequence number value based on the received sequence number, inserting the correct value in the TCP CODE BITS field, etc. The type of response packet may be determined based on the fields in the received packet. For example, if the CODE BITS field in the TCP header of the received packet indicates that the received packet is a SYN packet, then programmable stateless packet processor 110 changes the bits in the CODE BITS field of the outgoing packet to indicate that the packet is a SYN plus ACK. In another example, if the incoming packet contains data, programmable stateless packet processor 110 may set the appropriate bits in the CODE BITS field of the outgoing packet to indicate that the outgoing packet contains an acknowledgement.

Once the packet is constructed, in step 460, the packet is sent to the device under test. Thus, as illustrated in FIG. 4, a programmable stateless packet processor according to an embodiment of the present invention is capable of formulating a response packet based on a receive packet without maintaining any state regarding a previously received packet.

In order to efficiently respond to received packets in a stateless manner, programmable stateless packet processor may utilize a number of data structures in order to classify and prepare responses to incoming packets. In one exemplary embodiment, programmable stateless packet processor 110 utilizes a packet classification table to classify incoming packets, a response table to determine responses for each packet classification, and a packets table to determine a packet format for each response type. A packet classifications table may contain packet classification identifiers or pointers and corresponding offsets and patterns associated with each identifier. For example, a packet classification table may classify the following types of TCP packets: SYN, SYNACK, ACK, ACK With GET, FIN, FINACK, RST. A packet classification table may contain bit patterns and offsets for each of the above-listed packet types.

The packet classification identifiers extracted from the packet classification table may be used to locate responses in a response table. There may be multiple responses in the response table corresponding to each packet classification type. In a situation where there are multiple responses for a given packet classification type, the responses may be ordered and the programmable stateless packet processor may execute the responses in sequence. In the response table, each response may include a packet classification identifier, a starting packet identifier, the number of packets to be included in the response, and instructions for determining acknowledgement and sequence numbers to be included in the response packet.

Each packet identifier in the response table may be used to locate a corresponding packet template in a packet table. The Packet table may contain templates for various types of response packets, such as SYN packets, ACK packets, data packets, etc. These response templates may be used to build outgoing packets based on data extracted from received packets in the manner discussed above with regard to FIG. 4. There may be multiple packets corresponding to each packet identifier.

In operation, when the programmable stateless packet processor 110 receives a packet, it searches the packet for various patterns located at various offsets according to the packet classification table. In response to locating a matching pattern, the programmable stateless packet processor 110 uses extracts the packet classification ID and uses this value to obtain a response from the response table. The programmable stateless packet processor 110 uses information extracted from the response table to extract a template from the packets table. The programmable stateless packet processor 110 then builds the packet using the extracted template. This process may be repeated for each response stored in the response table for the given packet type and each packet in the packets table until the desired packet is sent.

Figure 5:
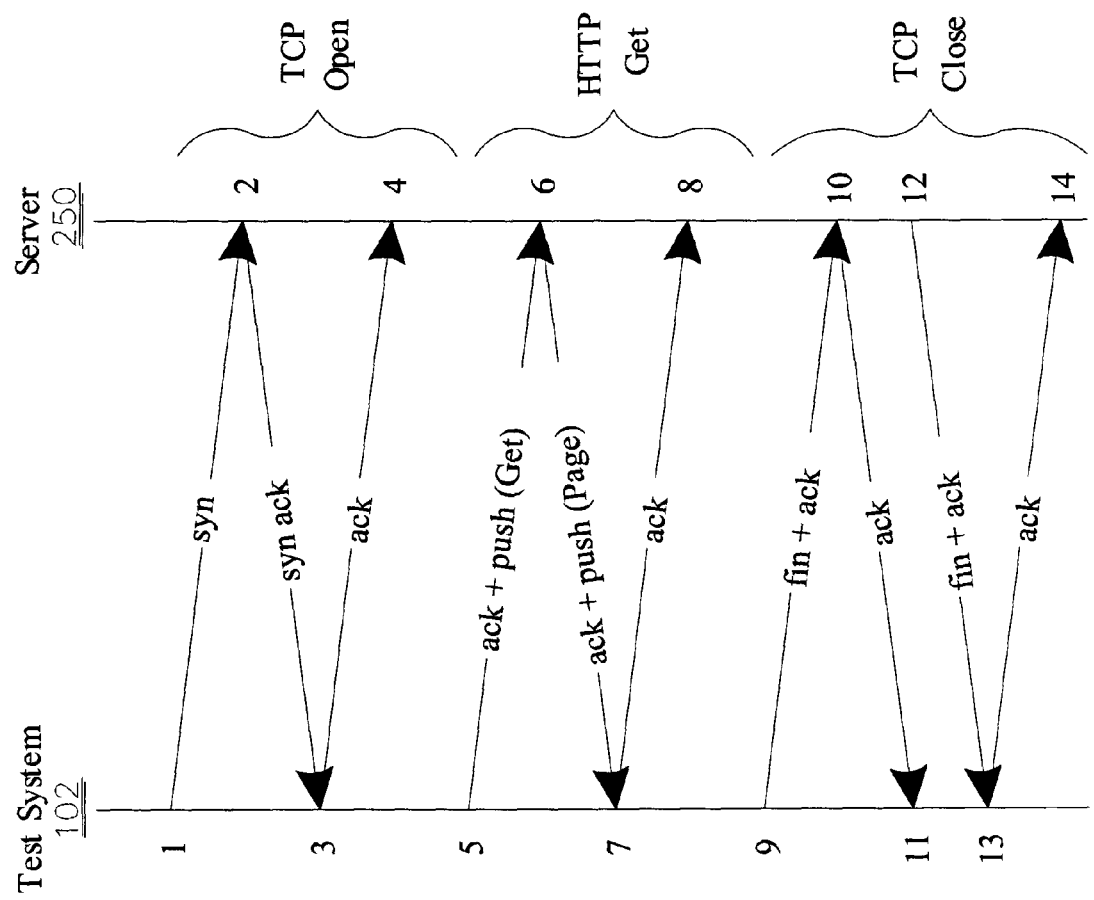
FIG. 5 is a message flow diagram illustrating exemplary messages sent between a test device and a device under test according to an embodiment of the present invention.

Referring now to FIG. 5, there is shown a message flow diagram illustrating messages that may be sent between the programmable stateless packet processor 110 of the test device 102 and the server 250 in an HTTP GET transaction. In line 1 of the message flow diagram, the programmable stateless packet processor 110 formulates and sends a SYN packet to the server 250. Unlike a full TCP/IP client, programmable stateless packet processor of the test device 102 may maintain no state about having sent the SYN packet. In line 2 of the message flow diagram, the server 250 receives a SYN packet and sends a SYN plus ACK. In line 3 of the message flow diagram, the programmable stateless packet processor 110 receives the SYN plus ACK, determines that an ACK is required based only on the received packet, and sends the ACK. In line 4 of the message flow diagram, the server 250 considers the connection with the test device 102 to be open. Because the test device 102 does not maintain connection state information, the test device 102 does not know whether the connection is open. However, in the scenario illustrated in FIG. 5, the test device 102 assumes that the connection is open after sending the ACK in line 3.

In line 5 of the message flow diagram, the programmable stateless packet processor 110 of the test device 102 sends a TCP segment containing an acknowledgement plus an HTTP GET request to the server 250 to request data from the server 250. In line 6 of the message flow diagram, the server 250 receives the HTTP GET message, extracts the requested data, and sends the requested data to the test device 102. In line 7 of the message flow diagram, the test device 102 receives the data and formulates a response packet based on the data packet. In this case, the response packet is an ACK packet.

In line 9 of the message flow diagram, the programmable stateless packet processor 110 of the test device 102 sends a FIN plus ACK packet to the server 250 to initiate a connection close. In line 10 of the message flow diagram, the server 250 receives the FIN and sends an ACK to the FIN. In line 11 of the message flow diagram, the programmable stateless packet processor 110 of the test device 102 receives the ACK. Because the ACK does not include any data in this example, the programmable stateless packet processor 110 of the test device 102 determines that no response is required. In line 12 of the message flow diagram, the server 250, sends a FIN plus ACK packet to the test device 102 to instruct the test system to close its connection. In line 13 of the message flow diagram, the programmable stateless packet processor 110 of the test device 102 receives the SYN plus ACK packet. Since the programmable stateless packet processor 110 does not know that the connection is open, the programmable stateless packet processor 110 simply sends an acknowledgement to the FIN packet. In line 14 of the message flow diagram, the server 250 receives the FIN packet, and closes and releases resources for its local connection.

Multiple simulated connections and HTTP requests may be concurrently initiated with a device under test by repeating the steps illustrated in FIG. 5 for each simulated connection. Utilizing HTTP to test stateful network communications devices is desirable because HTTP is the primary protocol used by web browsers to obtain web pages on the Internet. However, as stated above, the present invention is not limited to using HTTP to test stateful network communications devices. Any stateful application may be used.

Test Scenarios

An exemplary procedure for performing each of the test metrics illustrated in Table 2 will now be described.

1. Set up client (or simulated client) applications. Enough clients must be set up to generate the maximum number of sessions/second or the total concurrent sessions, whichever is greater. For example, if general purpose PCs are being used as host processors in implementing the test, about 2,000 sessions/second will be generated by each machine using HTTP. Configuration information for this test scenario includes:

a. IP addresses of clients
  b. Names or IP addresses of server
  c. If servers are not on same network as clients, the IP address of the gateway to be used to reach the servers from the client network
  d. The pages to be requested (for HTTP)
  e. Whether to use HTTP/11.0 (close session after each page) or HTTP/11.1 (keep session open for multiple page requests)
  f. Other application-specific information 2. Set up server applications. Enough servers must be set up to respond to the number of requests/second that will be generated or to maintain the maximum number of concurrent sessions, whichever is greater.

3. Set up instrumentation to measure all desired metrics. This may be part of client applications, server applications or a passive monitoring device.

4. Execute test.

A test screen may include a first input area to allow a user to select the total number of simulated clients and the total number of concurrent sessions. A second input area may allow the user to input the IP address, the gateway address, and the sub-net address for the first client used in the test. A third input area may allow the user to input the IP address, gateway address, and sub-net mask of the first server to be used in the test.

A system for testing stateful network communications devices according to an embodiment of the present invention may collect and display statistics for each test performed. Connection rate data may be collected by a test system according to an embodiment of the present invention. The connection rate data may include page requests per second, connections requested per second, concurrent sessions, page failure responses per second, pace responses per second, and connections accepted per second. These and other measurements may be collected, displayed to the user in an easily understood format, and used to evaluate the performance of a device under test.

Performance Comparison

A system for testing a stateful network communications device according to the present invention achieves higher performance at a lower cost than conventional systems. Depending on how stateful the device being tested is, and how much of a full TCP stack it implements, there are several alternative means of generating adequate traffic to test the performance limits of the device. Each method presents a tradeoff between cost, complexity and realism. Determining which method is the least expensive acceptable method depends on validating the test results for each method against those obtained with real traffic. A system for testing stateful network communications devices according to the present invention gives better performance per unit cost over conventional test systems.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of testing real-world performance of a system under test coupled to a communications network, the method comprising coupling a device to the communications network, the device comprising a chassis and one or more adapter cards, the adapter cards comprising hardware and software the device setting up for simulation of a realistic mix of network traffic on the communications network the device simulating the realistic mix of network traffic on the communications network the device setting up for engaging in stateful TCP connections with the system under test the device engaging in stateful TCP connections with the system under test concurrently with the step of simulating the realistic mix of network traffic on the communications network, resulting in additional network traffic on the communications network the device measuring performance of the system under test for the stateful TCP connections under load of the simulated network traffic from the device.

2. The method of testing real-world performance of a system under test of claim 1, wherein the system under test comprises an application, the application operative on a server, the application for providing user-level interaction with plural client computers on the communications network.

3. The method of testing real-world performance of a system under test of claim 1, wherein the system under test comprises a server load balancer.

4. The method of testing real-world performance of a system under test of claim 1, wherein the system under test comprises a stateful network communications device.

5. The method of testing real-world performance of a system under test of claim 1, wherein the simulated network traffic is generated by a stateless packet processor.

6. The method of testing real-world performance of a system under test of claim 1, wherein the system under test comprises a stateful application which uses underlying services of TCP.

7. The method of testing real-world performance of a system under test of claim 6, wherein the system under test comprises an HTTP server.

8. The method of testing real-world performance of a system under test of claim 6, wherein the system under test comprises an FTP server.

9. The method of testing real-world performance of a system under test of claim 1 further comprising modifying a behavior of the network traffic simulated by the device continuing to engage in stateful TCP connections with the system under test continuing to measure performance of the system under test for the stateful TCP connections.

10. The method of testing real-world performance of a system under test of claim 9, the modifying step comprising using performance metrics based on the stateful TCP connections to modify the behavior of the simulated network traffic to more closely simulate a realistic mix of network traffic.

11. The method of testing real-world performance of a system under test of claim 10 wherein the performance metrics are selected from the group consisting of retransmission rate, fragmentation, packet sizes, and drop/reset rates.

12. The method of testing real-world performance of a system under test of claim 9, the modifying step comprising a user using a control program to change the behavior of the simulated network traffic via a system interface.

13. The method of testing real-world performance of a system under test of claim 12, the modifying step comprising the user managing multiple ports in a coordinated fashion.

14. An apparatus for testing real-world performance of a system under test coupled to a communications network, the apparatus comprising a chassis one or more adapter cards disposed in the chassis, the adapter cards comprising hardware and software, the hardware and software for setting up for simulation of a realistic mix of network traffic on the communications network simulating the realistic mix of network traffic on the communications network setting up for engaging in stateful TCP connections with the system under test engaging in stateful TCP connections with the system under test concurrently with simulating the realistic mix of network traffic on the communications network, resulting in additional network traffic on the communications network measuring performance of the system under test for the stateful TCP connections under load of the simulated network traffic.

15. The apparatus for testing real-world performance of a system under test of claim 14 wherein the adapter cards include a stateless packet processor for simulating the realistic mix of network traffic on the communications network.

16. The apparatus for testing real-world performance of a system under test of claim 14 further comprising hardware and software for modifying a behavior of the simulated network traffic.

17. The apparatus for testing real-world performance of a system under test of claim 16, further comprising hardware and software for using performance metrics for the stateful TCP connections to modify the behavior of the simulated network traffic to more closely simulate a realistic mix of network traffic.

18. The apparatus for testing real-world performance of a system under test of claim 17 wherein the performance metrics are selected from the group consisting of retransmission rate, fragmentation, packet sizes, and drop/reset rates.

19. The apparatus for testing real-world performance of a system under test of claim 14 further comprising hardware and software for changing a behavior of the simulated network traffic in response to user instructions.

20. An apparatus for testing real-world performance of a system under test coupled to a communications network, the apparatus comprising:

a chassis; and one or more adapter cards disposed in the chassis, each adapter card comprising:

a hardware programmable stateless packet processor to simulate a realistic mix of network traffic on the communications network, and a processor coupled to a memory, the processor executing a TCP stack for engaging in stateful TCP connections with the system under test concurrently with simulating the realistic mix of network traffic on the communications network, resulting in additional network traffic on the communications network, and measuring performance metrics of the system under test for the stateful TCP connections under load of the simulated realistic mix of network traffic.

21. The apparatus for testing real-world performance of a system under test of claim 20, further comprising a controller to instruct the programmable stateless packet processor to modify a behavior of the simulated network traffic.

22. The apparatus for testing real-world performance of a system under test of claim 21, wherein the controller instructs the programmable stateless packet processor to modify the behavior of the simulated network traffic to more closely simulate a realistic mix of network traffic based on the performance metrics.

23. The apparatus for testing real-world performance of a system under test of claim 22 wherein the performance metrics are selected from the group consisting of retransmission rate, fragmentation, packet sizes, and drop/reset rates.

24. The apparatus for testing real-world performance of a system under test of claim 21, wherein the controller instructs the programmable stateless packet processor to modify a behavior of the simulated network traffic in response to user instructions.

25. An enterprise load system for testing a system under test available on a communications network, the enterprise load system comprising:
    a hardware stateless packet processor for simulating real-world network traffic on the communications network;
    a processor coupled to a memory, the processor executing a TCP stack for
        generating stateful TCP connections across the communications network with the system under test, each stateful TCP connection including receiving at least one packet from the system under test and sending at least one response packet in response to the received packet, and
        measuring performance of the system under test in supporting the stateful TCP connections from the second means in the presence of the simulated traffic on the communication network from the first means; and
    a controller coupled to the hardware stateless packet processor, the controller for changing quantity and quality of the network traffic simulated by the hardware stateless packet processor,
    wherein the hardware stateless packet processor, the processor generating stateful TCP connections, and the processor measuring performance of the system under test operate concurrently.

26. The enterprise load system for testing a system under test available on a communications network of claim 25, wherein the system under test comprises a stateful system under test which uses underlying services of TCP.

27. The enterprise load system for testing a system under test available on a communications network of claim 26, wherein the system under test comprises an HTTP server.

28. The enterprise load system for testing a system under test available on a communications network of claim 26, wherein the system under test software system comprises an FTP server.

29. The enterprise load system for testing a system under test available on a communications network of claim 25, the controller further for using performance metrics measured by the processor to cause the hardware stateless packet processor to more closely simulate a realistic mix of network traffic.

30. The enterprise load system for testing a system under test available on a communications network of claim 29 wherein the performance metrics are selected from the group consisting of retransmission rate, fragmentation, packet sizes, and drop/reset rates.

31. The enterprise load system for testing a system under test available on a communications network of claim 25 wherein the controller is responsive to instructions directed to the enterprise load system for changing a behavior of the simulated network traffic.

32. A method of testing a system under test available on a communications network, the method comprising:
    simulating real-world network traffic on the communications network
    generating stateful TCP connections across the communications network with the system under test
    measuring performance metrics of the system under test in supporting the stateful TCP connections in the presence of the simulated real-world network traffic
    changing quantity and quality of the simulated real-world network traffic
    wherein the steps of simulating, generating and measuring are performed concurrently.

33. The method of testing a system under test available on a communications network of claim 32, wherein the simulated network traffic is generated by a stateless packet processor.

34. The method of testing a system under test available on a communications network of claim 32, wherein the system under test comprises a stateful application which uses underlying services of TCP.

35. The method of testing a system under test available on a communications network of claim 34, wherein the system under test comprises an HTTP server.

36. The method of testing a system under test available on a communications network of claim 34, wherein the system under test comprises an FTP server.

37. The method of testing a system under test available on a communications network of claim 32 further comprising
    modifying a behavior of the simulated network traffic
    continuing to generate interactive transactions with the system under test software system
    continuing to measure performance of the system under test.

38. The method of testing a system under test available on a communications network of claim 37, the modifying step comprising using the performance metrics to modify the behavior of the simulated network traffic to more closely simulate a realistic mix of network traffic.

39. The method of testing a system under test of claim 38 wherein the performance metrics are selected from the group consisting of retransmission rate, fragmentation, packet sizes, and drop/reset rates.

40. The method of testing a system under test available on a communications network of claim 37, the modifying step comprising a user using a control program to change the behavior of the simulated network traffic via a system interface.

41. The method of testing a system under test available on a communications network of claim 40, the modifying step comprising the user managing multiple ports in a coordinated fashion.

* * * * *